Feb. 2, 1960  R. E. STOLL  2,923,261
FUEL FEEDING MECHANISM FOR A GAS TURBINE
Filed March 19, 1956
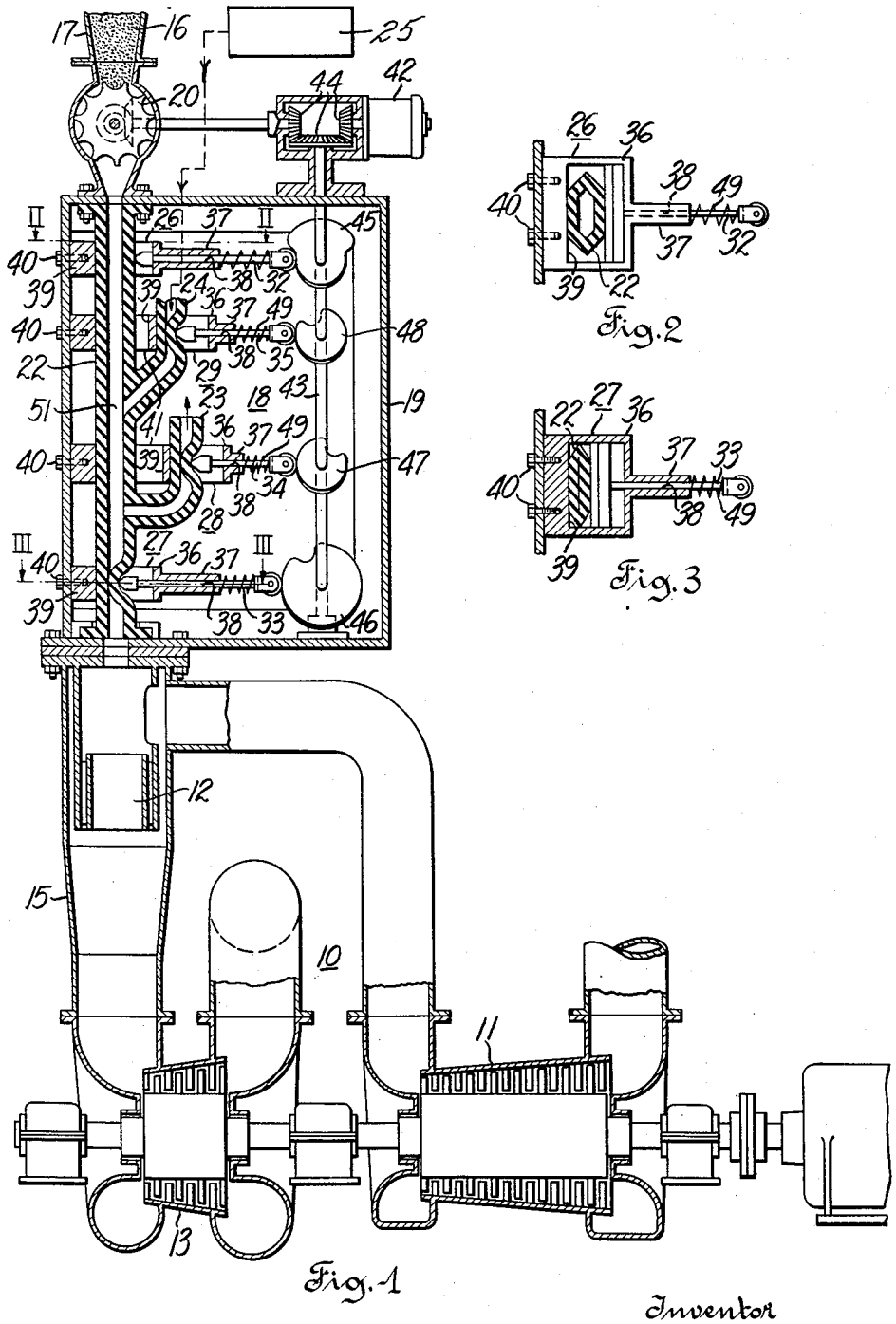
Inventor
Robert E. Stoll
by Robert B. Benam
Attorney United States Patent Office 2,923,261
Patented Feb. 2, 1960

2,923,261

FUEL FEEDING MECHANISM FOR A GAS TURBINE

Robert E. Stoll, Oconomowoc, Wis., assignor to Allis-Chalmers Manufacturing Company, Milwaukee, Wis.

Application March 19, 1956, Serial No. 572,319

7 Claims. (Cl. 110—104)

This invention relates generally to gas turbines. More particularly this invention relates to an improvement on the fuel feeding mechanism for gas turbines disclosed in the copending application to the same assignee of Robert C. Allen, Serial No. 572,419, filed March 19, 1956, and described below.

There is a continuing effort by the gas turbine industry to provide an efficient, long wearing device for repeatedly feeding a predetermined charge of fuel, such as powdered coal, into the combustion chamber of a gas turbine and at the same time keep the source of fuel sealed from the high pressure air in the turbine power plant. One such device developed by the prior art is a gravitational fuel feeding mechanism which seals the source of fuel from the high pressure zones in the turbine power plant. The gravitational fuel feeding mechanism contemplates a vertically disposed flexible member extending between the source of fuel and the combustion chamber of a gas turbine and having valve means positioned at either end of the member for sealing the member at appropriate times during the feeding cycle to prevent a blowback into the supply of fuel. The flexible member has a relief tube connected to atmosphere which has sealing means which operate in coordination with the sealing means of the flexible member. Fuel is fed by gravity from the source through the flexible member into the combustion chamber of the gas turbine power plant while the valves cooperate to keep the source of fuel sealed at all times from the air under the cycle pressure of the turbine. A gravitational fuel feeding mechanism of the type described above is disclosed and claimed in the above identified application of Robert C. Allen.

The present invention is an improvement on the above described feeding device and consists of a structure for injecting a stream of compressed air into the flexible tubular member to blow the fuel through the tubular member into the combustion chamber of the gas turbine. The compressed air is introduced into the tubular member at a pressure greater than the cycle pressure of the turbine power plant to force the charge of fuel out of the tubular member and into the combustion chamber. Valves cooperate to collapse the member and thereby seal the source of fuel from the compressed air injected into the member and from the air under the cycle pressure of the gas turbine.

The structure of this invention represents several improvements over prior art fuel feeding mechanism such as the one described above. First, a blast of compressed air is used to aid the force of gravity in feeding the charge of fuel into the combustion chamber. Secondly, the feeding cycle is quicker than prior art feeding mechanisms because there is no delay while the pressure in the tubular member and the combustion chamber equalize to permit the charge of fuel to drop from the member into the combustion chamber by gravity. Thirdly, the feeding device of this invention is more efficient than prior art fuel feeding mechanisms because the jet of compressed air will blow all the fuel out of the flexible member and none of the fuel will stick to the sides of the tube.

Therefore, it is the object of this invention to provide a new and improved fuel feeding device for gas turbines.

Another object of this invention is to provide a new and improved fuel feeding device for a gas turbine having a forced air fuel feed.

Another object of this invention is to provide a new and improved fuel feeding device for a gas turbine which is more efficient than prior art fuel feeding devices.

Objects and advantages other than those set forth above will be apparent from the following description when read in conjunction with accompanying drawings in which:

Fig. 1 is a schematic view, partly in section of a gas turbine power system embodying the feeding device of this invention;

Fig. 2 is a cross section view taken along the line II—II of Fig. 1 showing the flexible member and a valve in the open position; and Fig. 3 is a cross section view taken along the line III—III of Fig. 1 showing the flexible member and a valve in the closed position.

A gas turbine power system 10 is illustrated in Fig. 1 and comprises a compressor 11, a combustion chamber 12, and a gas turbine 13 operably connected together by suitable ducts 15. Air enters the compressor 11 where it is compressed and then flows into a duct 15 where it mixes with the fuel. The air fuel mixture then enters the combustion chamber 12 where it is burned and converted to a hot gas which exhausts through the turbine 13 imparting rotary motion thereto. The fuel may be any of the suitable fuels adapted for use with gas turbines, however, powdered coal 16 stored in a bin 17 has been illustrated for use in this gas turbine. A feeding mechanism 18 is provided between the source of fuel in the bin 17 and the combustion chamber 12 which is positioned in a duct 15 between the compressor 11 and the gas turbine 13.

The feeding mechanism 18 is mounted on a frame 19 and includes means for measuring and depositing a predetermined charge of fuel, herein shown as a star metering wheel 20 positioned immediately below the bin 17 in which the powdered coal 16 is stored. Although a star metering wheel is illustrated, any device for depositing a predetermined charge of fuel may be used. A flexible tubular member 22 is connected to the star metering wheel 20 immediately beneath the wheel and extends to the duct 15 in which the combustion chamber 12 is positioned. Preferably as shown the member 22 extends vertically downward to the combustion duct 15 to aid the flow of powdered coal through the member 22 into the combustion chamber 12. The member 22 is provided with a flexible relief tube 23 which exhausts to atmosphere and a flexible intake tube 24 which is connected to a source of compressed air, now shown, under a higher pressure than the cycle pressure of the turbine power plant. These tubes 23, 24 are positioned intermediate the longitudinally spaced extremities of the member 22 and tube 24 is preferably positioned between tube 23 and upper end of the member 22.

The flexible relief tube 23 provides an escape to atmosphere for the high pressure air in the member 22. Any suitable exhaust means, such as rigid tubes, could be used with the feeding mechanism of this invention. However, a flexible relief tube of the same material as the member 22 is preferred for use in the feeding mechanism 18.

The flexible intake tube 24 is for providing a blast of compressed air to the flexible member 22 to blow the powdered coal out of the member 22 and into the combustion chamber 12. The tube 24 is connected by suitable ducts to a source 25 of compressed air. Other means of injecting compressed air into the member may be used with the feeding device of this invention and the flexible intake tube 24 is illustrated as a matter of convenience.

Valve means 26, 27, 28, 29 are provided for collapsing and thereby sealing the member 22 and the tubes 23, 24. Valve means 26, 27 are for controlling the flow of fuel through the member 22 and for sealing the member 22 to prevent a blowback of high pressure air from the ducts 15 into the powdered coal 16 in the storage bin 17. Those valve means 26, 27 are positioned adjacent the longitudinally spaced extremities of the member. One of the valve means 26 or 27 is closed at all times during the feeding cycle to seal the powdered coal in the bin from air in the power plant at cycle pressure. Valve means 28 acts as a pressure relief valve and is positioned adjacent the end of the relief tube 23 that exhausts to atmosphere. Valve means 29 regulates the injection of compressed air into the member 22 and is positioned adjacent the end of the intake tube 24 connected to the source of compressed air. The valve means comprise sliding cam rods 32, 33, 34, 35 and guides 36 suitably mounted on the frame 19.

As illustrated in Figs. 2 and 3, the guides 36 are substantially rectangular in cross section and have a stem 37 projecting outwardly from one side. The stem 37 of each guide 36 has a longitudinally extending bore 38 and is positioned to extend toward one of the cam rods 32, 33, 34, 35. The side of the guides 36 opposite the stem 37 acts as a backing plate 39 for the tubes 23, 24 or flexible member 22. The guides 36 are mounted on the frame 19 in any of the well known ways such as by mounting screws 40 and if necessary extension rods 41. The tubes 23, 24 and the member 22 fit within the rectangular portion of appropriately positioned guides 36. The cam rods 32, 33, 34, 35 are slidably mounted in the bores 38 of their respective guides 36 so that they can be actuated in a manner hereinafter described to engage and collapse the flexible member 22 and tubes 23, 24 against the backing plate 39 with sufficient force to form a seal against leakage of high pressure air in the ducts 15 and at the source of compressed air.

Fig. 2 illustrates a section of the flexible member 22 with the valve 26 in the open position. Fig. 3 illustrates a section of the flexible member 22 with the valve 27 in the closed position. In the closed position the member 22 is collapsed against the backing plate 39 to form a seal within the member 22.

The flexible member and tubes are preferably constructed of a rubber base material which will resist the abrasive wear caused by the powdered coal suspended in air. However, any flexible material having good abrasive wear resistant characteristics may be used for the member and the tubes. The tubes and members are collapsed by the valves to form a seal. Hence a small amount of wear on the inner side of the tube due to the abrasive action of the coal particles suspended in the air will not materially decrease the effectiveness of the seal because the tubes and members can be compressed a little more to compensate for the wear. It is obvious that valve 29 regulating the tube 24 to the source of compressed air will not be subjected to the amount of wear that the other valves are subjected to because the compressed air being regulated by valve 29 does not have coal particles suspended therein. Hence any of the well known valves could be used in the intake tube.

The entire feeding mechanism 18 is driven by an independently operated source of power such as the electric motor 42 illustrated in Fig. 1. The motor 42 is connected to the star metering wheel 20 and a cam shaft 43 through beveled gears 44. The cam shaft 43 is rotatably mounted on the frame 19 in a position substantially parallel to and spaced from the flexible member 22. Mounted on the cam shaft 43 are suitable cams 45, 46, 47, 48 positioned to operably engage the cam rods 32, 33, 34, 35, respectively. Resilient means, illustrated as coil springs 49, are provided for keeping the cam rods 32, 33, 34, 35 in constant working engagement with their respective cams 45, 46, 47, 48. One of the coil springs 49 surrounds each cam rod 32, 33, 34, 35 respectively between the end of the rod engaging its corresponding cam and the stem 37 of corresponding guides 36. These springs 49 cooperate with the ends of the cam rods 32, 33, 34, 35 and the stems 37 to bias the cam rods into constant working engagement with their respective cams 45, 46, 47, 48. The cams 45, 46, 47, 48 are arranged on the cam shaft 43 to actuate their respective cam rods 32, 33, 34, 35 during a portion of each revolution of the cam shaft 43 to open and close the valves 26, 27, 28, 29 according to a predetermined sequence. The cam shaft 43 and the star metering wheel 20 are cooperatively arranged with the beveled gears 44 to drive the feeding mechanism 18 repeatedly through the same cycle.

The feeding mechanism 18 of this invention operates in the following way. The star metering wheel 20 is continually rotating and depositing a predetermined charge of fuel from the bin 17 into the upper portion of the tubular member 22. The cam shaft 43 and the cams 45, 46, 48 are also continually rotating and thereby actuating the cam rods 32, 33, 34, 35 according to the following predetermined sequence. When the cycle begins all the valves 26, 27, 28, 29 are closed thereby collapsing the tubular member 22, the relief tube 23 and the intake tube 24 at four separate points forming a cavity 51 therein. Valve 26 is then opened permitting a predetermined charge of powdered coal to drop by gravity into the cavity 51. Valve 26 is then closed. After valve 26 closes valves 27 and 29 open. When valve 29 opens air under pressure is forced from the source of compressed air into the tubular member 22. With valve 27 open there is a clear channel of communication between the high pressure combustion zone 12 and the cavity 51 in the tubular member 22. Since the pressure at the source is higher than the cycle pressure in the combustion zone 12, the powdered coal is blown down through the tubular member 22 into the combustion chamber 12. After the coal has been blown into the combustion chamber 12, valves 27 and 29 are closed and valve 28 which operates the relief tube 23 is opened. The relief tube 23 exhausts to atmosphere and permits the high pressure air in the cavity 51 to escape until the pressure in the cavity 51 is reduced to atmospheric pressure. After the air in the cavity 51 and hence in the tubular member 22 is back to atmospheric pressure the valve 28 again seals the relief tube 23 and valve 26 opens. The cycle is then repeated.

The described structure provides for a forced air feed of the powdered coal from the member 22 into the combustion chamber 12 and insures that a blowback into the storage bin 17 will be prevented.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. A device for feeding fuel into a high pressure zone of a gas turbine power plant comprising a flexible tubular member having one end adaptable to be connected to said high pressure zone, supply means connected to the other end of said member for depositing a predetermined charge of fuel into said member, a relief tube connected to said member for exhausting to atmosphere, means for injecting into said member air under pressure higher than the pressure in said high pressure zone, valves for engaging said member and said tube in alternate sealing and unsealing relation, said valves being positioned adjacent the longitudinally spaced extremities of said member and intermediate the ends of said tube, means for actuating said valves, said injecting means and said supply means in a predetermined sequence, said actuating means cooperating with said valves to maintain at all times at least one of said valves adjacent said member in a sealing position and to maintain said valve positioned adjacent the end of said member connected to said supply means and said relief tube in a sealing position when the valve positioned adjacent the end of said member adapted to be connected to said high pressure zone and the air injecting means are opened, whereby fuel is fed from said supply means into said member by gravity and blown from said member by air under pressure and said supply means is at all times sealed from air in the power plant under high pressure.

2. A device for feeding fuel into a high pressure zone of a gas turbine power plant comprising a downwardly extending flexible tubular member having its lower end adaptable to be connected to said high pressure zone, supply means connected to the other end of said member for depositing a predetermined charge of fuel into said member, a flexible relief tube connected to said member for exhausting to atmosphere, an air injector connected to said member for supplying to said member air under pressure higher than the pressure in said high pressure zone, valves for engaging said member and said tube in alternate sealing and unsealing relation, said valves being positioned adjacent the longitudinally spaced extremities of said member and intermediate the ends of said tube, a valve for controlling the flow of air through said injector, means for actuating said valves and said supply means in a predetermined sequence, said actuating means cooperating with said valve to maintain at all times at least one of said valves adjacent said member in a sealing position and to maintain said valves adjacent the upper end of said member and said relief tube in a sealing position when said valve adjacent the lower end of said member and said valve controlling said injector are in the unsealing position whereby fuel is fed from said supply means into said member by gravity and blown from said member by air under pressure and said supply means is at all times sealed from air in the power plant under high pressure.

3. A device for feeding fuel into a high pressure zone of a gas turbine power plant comprising a vertically disposed flexible tubular member having its lower end adaptable to be connected to said high pressure zone, supply means connected to the other end of said member for depositing a predetermined charge of fuel into said member, a flexible relief tube connected to said member for exhausting to atmosphere, a flexible intake tube connecting said member to a source of air under pressure higher than the pressure in said high pressure zone, cam rods for engaging said member and said tubes in alternate sealing and unsealing relation, said rods being positioned adjacent the longitudinally spaced extremities of said member and intermediate the ends of said tubes, a rotatably mounted cam shaft, cams mounted on said cam shaft and positioned to operatively engage corresponding said cam rods, said cams being designed so that corresponding said cam rods are actuated during a portion of each revolution of said cams, means for rotating said cams and said supply means according to a predetermined sequence, said cams cooperating with said rods to maintain at all times at least one of said rods engaging said member in a sealing position and to maintain said rod engaging the upper end of said member and said rod engaging said relief tube in a sealing position when the rod engaging the lower end of said member and the rod engaging said tube connected to the source of high pressure are in the unsealing position whereby fuel is fed from said supply means into said member by gravity and blown from said member by air under pressure and said supply means is at all times sealed from air in the power plant under high pressure.

4. A device for feeding fuel into a high pressure combustion zone of a gas turbine power plant comprising a vertically disposed flexible tubular member having its lower end adaptable to be connected to said high pressure combustion zone, a toothed wheel connected to the other end of said member for depositing a predetermined charge of fuel into said member, a flexible relief tube connected to said member for exhausting to atmosphere, a flexible intake tube connecting said member to a source of air under pressure higher than the pressure in the combustion zone, cam rods for engaging said member and said tubes in alternate sealing and unsealing relation, guide means for positioning said rods adjacent the longitudinally spaced extremities of said member and intermediate the ends of said tubes and for cooperating with said rods in sealing said tubes and said member, a rotatably mounted cam shaft, cams mounted on said cam shaft and positioned to operatively engage corresponding said cam rods, said cams being formed so that corresponding said cam rods are actuated during a portion of each revolution of said cams according to a predetermined sequence, and a power driven shaft operably connected to said wheel and said cam shaft for rotating said wheel and for driving said cams repeatedly through the same cycle, said cams cooperating with corresponding said rods to maintain at all times at least one of said rods engaging said member in a sealing position and to maintain said rods adjacent the upper end of said member and adjacent said relief tube in a sealing position when the rods engaging the lower end of said member and said tube connected to the air under high pressure are in the unsealing position, whereby fuel is fed from said wheel into said member by gravity and then blown from said member by air under pressure while said wheel is at all times sealed from the air in the power plant under high pressure.

5. A device for feeding fuel into a high pressure zone of a gas turbine comprising a vertically disposed flexible tubular member having its lower end adaptable to be connected to said high pressure combustion zone, a star metering wheel connected to the other end of said member and for depositing a predetermined charge of fuel into said member, a flexible relief tube connected to said member for exhausting to atmosphere, a flexible intake tube connecting said member to a source of air under pressure higher than the pressure in the combustion zone, cam rods for engaging said member and said tubes in alternate sealing and unsealing relation, guides for positioning said rods adjacent the longitudinally spaced extremities of said member and intermediate the ends of said tubes, said guides having backup plates positioned adjacent said member and said tubes and spaced from said rods for cooperating with said rods in sealing said member and said tubes, a rotatably mounted cam shaft, cams mounted on said cam shaft and positioned to operatively engage corresponding said cam rods, said cams being formed so that corresponding said cam rods are actuated during a portion of each revolution of said cams according to a predetermined sequence, and a drive shaft driven by a motor and being operably connected to said wheel and said cam shaft for rotating said wheel and for driving said cams repeatedly through the same cycle, said cams cooperating with corresponding said rods to maintain at all times at least one of said rods adjacent said member in a sealing position and to maintain said rod engaging the upper end of said member and said rod engaging said relief tube in sealing positions when the rods engaging the lower end of said member and the air intake tube are in the open position, whereby fuel is fed from said wheel by gravity into said member and then blown from said member by air under pressure while said wheel is at all times sealed from the air under high pressure in the system.

6. A device for feeding fuel into a high pressure combustion zone of a gas turbine comprising a vertically disposed flexible tubular member having its lower end adaptable to be connected to said high pressure combustion zone, a star metering wheel connected to the upper end of said member for supplying a predetermined charge of fuel to said member, first and second cam rods positioned adjacent the longitudinal spaced extremities of said member for engaging said member in alternate sealing and unsealing relation, a flexible relief tube connected to said member between said first and second cam rods for exhausting to atmosphere, a flexible intake tube connected to said member between one of said cam rods and said relief tube, said intake tube connecting said the pressure in said combustion zone, third and fourth cam rods positioned adjacent said tubes for engaging said tubes in alternate sealing and unsealing relation, guides for receiving said rods as they move toward and away from said member and said tubes, said guides having backup plates positioned on the opposite side of said tubes and member from said cam rods, said backup plates forming a support upon which said tubes and said member are collapsed by said cam rods to seal said tubes and said member, a rotatably mounted cam shaft, cams mounted on said cam shaft and positioned to operatively engage corresponding said cam rods, said cams being formed so that corresponding said cam rods are moved toward and away from said tubes and said member during a portion of each revolution of said cams according to a predetermined sequence, and a drive shaft driven by a suitable source of power and being operably connected to said wheel and said cam shaft for rotating said wheel and for driving said cams repeatedly through the same cycle, said cams cooperating with corresponding said rods to maintain at all times at least one of said rods engaging said member in a sealing position and to maintain said rods engaging the upper end of said member and said relief tube in sealing positions when the rods engaging the lower end of said member and said air intake tube are in the open position, whereby fuel is fed by gravity from said wheel to said member and blown from said member by air under pressure and said wheel is sealed from the air under high pressure in the power plant and at said source of compressed air.

7. A device for feeding fuel into a high pressure combustion zone of a gas turbine compriisng a vertically disposed flexible tubular member having its lower end adaptable to be connected to said high pressure combustion zone, supply means connected to the upper end of said member for supplying a predetermined charge of fuel to said member, first and second cam rods positioned adjacent the longitudinally spaced extremities of said member for engaging said member in alternate sealing and unsealing relation, a flexible relief tube connected to said member between said first and second cam rods for exhausting to atmosphere, a flexible intake tube connected to said member between one of said cam rods and said relief tube, said intake tube connecting said member to a source of air under pressure higher than the pressure in said combustion zone, third and fourth cam rods positioned adjacent said tubes for engaging said tubes in alternate sealing and unsealing relation, guides for receiving said rods as they move toward and away from said member and said tubes, said guides defining a rectangular section for receiving said member and said tubes and having an outwardly extending stem, said stem having a longitudinally extending bore positioned to receive a corresponding said cam rod in relative sliding relation thereto, the side of said guides opposite said stem forming backup plates upon which said tubes and said member are collapsed by said cam rods to seal said tubes and said member, a rotatably mounted cam shaft, cams mounted on said cam shaft and positioned to operatively engage corresponding said cam rods, springs mounted on said cam rods and extending to said stems for biasing said rods into constant working engagement with said cams, said cams being formed so that corresponding said cam rods are moved toward and away from said tubes and said member during a portion of each revolution of said cams according to a predetermined sequence, and a drive shaft driven by a suitable source of power and being operably connected to said supply means and said cam shaft for operating said supply means and for driving said cams repeatedly through the same cycle, said cams cooperating with corresponding said rods to maintain at all times at least one of said rods engaging said member in a sealing position and to maintain said rods engaging the upper end of said member and said relief tube in sealing positions when the rods engaging the lower end of said member and said intake tube are in the open position, whereby fuel is fed by gravity from said supply means to said member and blown from said member by air under pressure and said supply means is sealed from the air under high pressure in the power plant and at said source of compressed air.

References Cited in the file of this patent
UNITED STATES PATENTS

| | | |
|---|---|---|
| 759,750 | Rosenthal | May 10, 1904 |
| 931,579 | Doublet | Aug. 17, 1909 |
| 955,606 | Moreau | Apr. 19, 1910 |
| 1,887,733 | Sablik | Nov. 15, 1932 |
| 1,943,589 | Domina | Jan. 16, 1934 |
| 1,979,320 | Domina | Nov. 6, 1934 |
| 2,387,923 | McBrien | Oct. 30, 1945 |
| 2,590,458 | Prickett | Mar. 25, 1952 |

FOREIGN PATENTS

| | | |
|---|---|---|
| 689,486 | Great Britain | Mar. 25, 1953 |

UNITED STATES PATENT OFFICE
CERTIFICATE OF CORRECTION

Patent No. 2,923,261                      February 2, 1960

Robert E. Stoll

It is hereby certified that error appears in the printed specification of the above numbered patent requiring correction and that the said Letters Patent should read as corrected below.

Column 7, line 14, after "said", third occurrence, insert -- member to a source of air under pressure higher than --.

Signed and sealed this 19th day of July 1960.

(SEAL)

Attest:
KARL H. AXLINE
Attesting Officer

ROBERT C. WATSON
Commissioner of Patents